United States Patent [19]
Hoogeveen et al.

[11] 3,819,499
[45] June 25, 1974

[54] DEVICE FOR DETECTING ONE OR MORE OXIDIZABLE COMPONENTS IN A SAMPLE

[75] Inventors: Leonardus Petrus Johannes Hoogeveen; Petrus Floris Butzelaar, both of Emmasingel, Eindhoven, Netherlands

[73] Assignee: U.S. Philips Corporation, New York, N.Y.

[22] Filed: Apr. 20, 1972

[21] Appl. No.: 245,785

[30] Foreign Application Priority Data
Apr. 30, 1971 Netherlands.................... 7105976

[52] U.S. Cl......... 204/195 S, 23/253 PC, 23/255 E, 204/1 T
[51] Int. Cl............................................. B01k 3/00
[58] Field of Search.................. 23/253 PC, 230 PC; 204/195 S

[56] References Cited
UNITED STATES PATENTS

| | | | |
|---|---|---|---|
| 3,296,435 | 1/1967 | Teal et al.................... | 23/253 PC X |
| 3,527,567 | 9/1970 | Philyaw et al............. | 23/253 PC X |
| 3,560,156 | 2/1971 | Teal et al.................... | 23/253 PC X |
| 3,650,934 | 3/1972 | Hickam et al................. | 204/195 S |
| 3,654,112 | 4/1972 | Beekmans et al.............. | 204/195 S |
| 3,679,364 | 7/1972 | Teal et al.................... | 23/253 PC X |

*Primary Examiner*—Joseph Scovronek
*Attorney, Agent, or Firm*—Frank R. Trifari

[57] ABSTRACT

A device for detecting oxidizable components in a mixture in a reaction space through which a constant stream of gas is passed. A measuring and dosing cell for oxygen maintaining the oxygen content at an adjusted value is present before and after the reaction space. After injection of the sample the dosage current required for oxygen supplementation is a measure of the quantity of oxidizable component.

3 Claims, 1 Drawing Figure

PATENTED JUN 25 1974　　　　　　　　　　　　　　　3,819,499
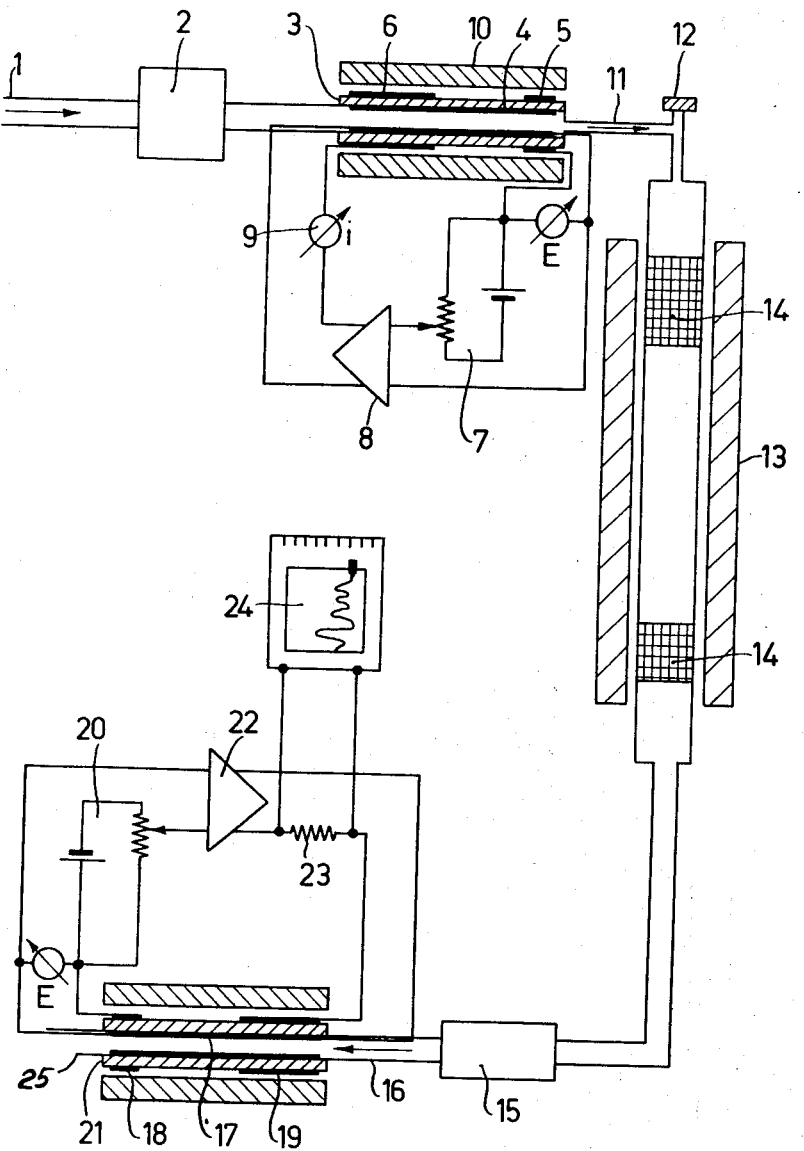

DEVICE FOR DETECTING ONE OR MORE OXIDIZABLE COMPONENTS IN A SAMPLE

The invention relates to a device for detecting one or more oxidizable components in a sample, particularly for determining the COD figure in water.

This COD figure, one of the terms which have in recent years become current in water pollution control, the "chemical oxygen demand" represents the number of milligrams of oxygen required per litre of water to decompose the impurities of organic nature present therein.

Different methods have been recommended in literature. The most conventional method is the one in which organic impurities are oxidized with the aid of potassium dichromate and in which the excess of $K_2Cr_2O_7$ is determined by retrotitration.

A quicker method is the one in which the organic impurities are burned over a catalyst at a high temperature.

According to V. A. Stenger and C. E. van Hall in Anal. Chem. 39, 206 (1967) a sample of water of 20 $\mu$l is burned over a platinum catalyst in an oxygen-free $CO_2$ stream and the quantity of carbon monoxide formed is measured with the aid of an infrared detector. To have a reliable measuring result the equipment must be regularly calibrated with the aid of standard samples. The detection limit of this determination is a COD figure of approximately 30 mg/litre.

A similar method in which instead of the COD figure the quantity of organic carbon is determined is described by E. R. Cropper c.s. in The Analyst 92, 436 (1967) and 94, 484 (1969). According to this method a sample of 2$\mu$ 1 is oxidized in a nitrogen stream by cupric oxide at 850° to 900° C. The $CO_2$ produced is passed over a nickel catalyst under the addition of hydrogen at 300°–350°C. while $CO_2$ is converted into methane whose quantity is detected by means of a flame-ionisation detector. The detection limit of this method is approximately 1 mg of carbon per litre of water at a reproducibility of ± 10 percent. This method also requires frequent calibration of the equipment with the aid of methane standard samples.

Another drawback of the known devices is that only a limited measuring range can be covered, whereas in practice a large range, for example, between 1 and 500 mg $O_2$/litre of water is to be covered.

The invention provides a measuring device with which COD figures can be determined very rapidly and very reliably, which device is to be calibrated only once. The device may perform detections fully automatically and is suitable for the measurement of COD figures of from 1 to 500 mg $O_2$/litre of water, which means that the device is suitable for measurements of both drinking water and of surface water and even of sewage water.

According to the invention the device for detecting one or more oxidizable components in a sample, comprising a reaction room in which a sample injected with a dosed excess of oxygen by means of an inert carrier gas is oxidized in the presence of a catalyst, and a detector is characterized in that both for dosing the oxygen before the reaction room and for measuring the consumed oxygen after this reaction room a known measuring cell and a dosing cell are used each consisting of a partition constituted by at least one solid substance which undergoes a reversible reaction with oxygen and then shows ionic conductivity, particularly stabilised $ZrO_2$, while both sides of said partition are provided with an electrode cladding, said measuring cell and dosing cell being possibly combined to one cell in which at least one of the two electrode coatings is electricaly interrupted and one part thereof is used as a measuring electrode and the other part is used as a dosing electrode controlled by the measuring electrode, the detector bringing the oxygen concentration in the carrier gas at the level of that in the injected carrier gas and indicating the current intensity in the dosing circuit as a measure of the concentration of the oxidizable component.

The combined measuring and dosing cell is described in the UK Specification 1,229,610 in the name of the Applicant. Instead of stabilised $ZrO_2$ which is preferably used, it is alternatively possible to use non-stabilised $ZrO_2$ or thorium oxide. The partition generally has the shape of a tube and the annular electrode coatings consist of, for example, porous platinum. When a gas mixture having a partial oxygen pressure $p_1$ is present within the tube and a gas mixture having a partial oxygen pressure $p_2$ is present outside it (advantageously air) a voltage difference E prevails between the electrodes on the inner side and those on the outer side which difference, according to the Nernst formula is $E = -$ constant $\times \log p_1/p_2$ When dosing oxygen, an electric current is passed through the $ZrO_2$ tube so that oxygen is transported through the wall of the tube proportionally to the value of the current. By comparing the measured voltage on the measuring electrodes with a reference voltage, for example, with the aid of a Poggendorf circuit, the difference between the voltages after electronic amplification may be used to control the oxygen dosage so that a constant partial oxygen pressure is adjusted. The shortage of oxygen is detected and supplemented by the zirconium oxide cell, while the quantity of the shortage is determined by the value of the dosing current and hence the concentration of the oxidizable component, i.e., the value of the COD figure.

It is to be noted that the above-mentioned UK Specification describes a gas-chromatic separation and determination of a mixture or organic materials which react with a gaseous agent, for example, oxygen. Said mixture is introduced into a gas-chromatographic column together with an inert carrier gas and is separated into the components. These components successively enter the detector placed behind the column, in this case a $ZrO_2$ measuring and dosing cell, and react with the oxygen present therein and being adjusted to a given partial pressure. A shortage is then produced which is supplemented by the dosing mechanism, the dosing current to be measured being a measure of the concentration of the relevant component in the mixture.

In this embodiment combustion, measuring and dosing is effected in one and the same cell in which the electrode material - platinum black - also serves as a catalyst for the oxidation reaction. Due to this action the platinum black becomes temporarily less active every time, so that the sensitivity of the measuring electrodes and the response of the two electrodes are detrimentally influenced. In the device according to the invention combustion is completely separated from detection and supplementation of oxygen, so that the latter functions are performed without any interference.

The device according to the invention in which a concentration of oxygen adapted to the value of the COD figure to be expected is adjusted in the gas entering and emerging from the combustion furnace has also the effect that a very large range of COD figures can be measured.

According to the invention a device for determining the COD figure makes it possible to measure not only the COD figure of a water sample, but simultaneously the quantity of dissolved oxygen. The sample is evaporated completely upon injection. The evolving oxygen will firstly signalize an excess in the detector, causing a negative current peak which is immediately followed by a positive current peak as a result of the shortage caused by the catalysed oxidation.

A valuable use of the device according to the invention relates to the protection of sewage control installations from overdosage.

In such installations the incoming water is subjected to an oxidation process after mechanical purification. A sudden large change in the composition of the incoming water may have disastrous influences on the micro-organism culture present so that the decomposition of organic material is greatly reduced. This means that the treatment of water becomes incomplete or is even not carried out at all. Up till now it has been attempted to prevent the influence of such large variations by overproportioning the installation which has increased the cost of the installation to a considerable extent.

By continuously determining the oxidizability of water with the aid of the device according to the invention after mechanical purification of the water, the signal obtained thereby may be used to automatically take measures against overdosage. For example, the incoming water may be passed on to a buffer vessel in case of a sudden large variation in the composition, in which vessel the water is diluted with purified effluent and/or undergoes a special treatment whereafter it can be passed on to the control installation again.

To illustrate the invention an embodiment of a device for determining the COD FIGURE will now be described with reference to a diagrammatic drawing.

A stream of an inert gas 1 is passed into the $ZrO_2$ measuring and dosing cell 3 through the flow regulator 2.

This cell, placed in a furnace 10 which maintains the cell at a constant temperature of, for example, 625°C, consists of a tube having a length of 200 mms, an external diameter of 0.8 mm and a wall thickness of 1.3 mms of stabilised $ZrO_2$, for example, $ZrO_2$ including 7.5 percent by weight of CaO. The outer side is provided with measuring electrode 5 and dosing electrode 6 which have a common counter electrode 4 on the inner side. The electrode coatings consist of a porous platinum layer provided by cathode sputtering. The measuring EMF is compared in a Poggendorf compensation circuit 7 with an EMF adjusted at a given oxygen pressure value, the difference current being applied through amplifier 8 to the dosing electrode. Oxygen is then dosed until the said difference current has become zero. The dosage current can be read on ammeter 9. The gas 11 thus dosed with oxygen is introduced into the combustion furnace 13. The water sample to be measured is injected at 12. The combustion tube is filled with quartz grains 4 serving as a catalyst and clad with porous platinum. The combustion gases are freed from water in the absorption column 15 filled with $CaSO_4$, and are subsequently (16) applied to a second measuring and dosing cell 21 identical to the first and likewise including measuring electrode 18, dosing electrode 19, common electrode 17, Poggendorf circuit 20 and amplifier 22. In the dosing circuit the voltage across resistor 23 is indicated by the registering voltmeter 24. The adjustment of the Poggendorf circuit is chosen to be such that the evolving gas 25 has the same partial oxygen pressure as the gas 11 entering the furnace. Reading on the registering voltmeter 24 is then a direct measure of the COD FIGURE of the sample.

Some examples of figures of measurements.

A 10 $\mu$ l standard sample having a COD FIGURE of 25 corresponding to a poor quality of drinking-water theoretically requires a quantity of oxygen which is equivalent to 3 m Coulomb so as to be decomposed in the device according to the invention. 3.03 ± 0.05 n Coul. was found. A 5 $\mu$ l standard sample having a COD FIGURE of 250 (sewage) theoretically requires 15 m Coul. 15.3 ± 0.03 m Coul. was found by experiment.

The device is formed for determining the COD FIGURE of polluted water, but it may alternatively be formed as an improved detector for determining the separated components after a gas-chromatographic column as described in the above-mentioned prior patent application. The components are then injected at 12 (see Figure).

Another possibility is to test exhaust gases of combustion engines for incompletely decomposed fuel which is still oxidizable.

What is claimed is:

1. Apparatus for measuring the chemical oxygen demand of a sample containing oxydizable material comprising:

an oxygen dosing cell for receiving a flow of predominately inert carrier gas and controlling the oxygen concentration thereof so as to deliver from said cell a gas mixture having a substantially constant oxygen concentration;

means for combining a sample containing oxydizable material with said gas mixture;

a combustion furnace receiving said combined sample and gas mixture for oxydizing said oxydizable material with oxygen in said gas mixture in the presence of a catalyst; and an oxygen measuring cell receiving the combustion products from said furnace for measuring the rate at which oxygen is being consumed in said furnace, wherein said dosing cell and said measuring cell each comprise:

a gas conduit having a wall portion primarily composed of at least one oxide which is capable of transferring oxygen through said wall portion predominately by migration of oxygen ions;

two electrode layers positioned on both sides of said wall portion, one of said electrode layers being electrically interrupted forming upstream and downstream electrode parts, said downstream part serving as a measuring electrode part and said upstream part serving as a control electrode part;

means cooperatively connected to said measuring electrode part and the other of said two electrodes for measuring the concentration of oxygen within said cell adjacent said measuring electrode part;

means cooperatively connected to said control electrode part and said other of said two electrodes for controlling oxygen transfer through said wall portion adjacent said control electrode part, said means for controlling being responsive to said means for measuring so as to maintain a predetermined oxygen concentration within said cell adjacent said measuring electrode part, said measuring cell further comprising means for measuring the rate at which oxygen is being transferred into said measuring cell through said wall portion of said measuring cell in order to maintain said predetermined oxygen concentration adjacent said measuring electrode part of said measuring cell, said rate at which oxygen is being transferred into said measuring cell being a measure of the rate at which oxygen is being consumed in said furnace, thereby also being a measure of the chemical oxygen demand of said sample.

2. Apparatus as defined in claim 1 wherein said wall portion of said dosing cell and said wall portion of said measuring cell is composed primarily of a metallic oxide.

3. Apparatus as defined in claim 2 wherein said metallic oxide is $ZrO_2$.

* * * * *